United States Patent [19]

Schönenberger et al.

[11] Patent Number: 4,754,884

[45] Date of Patent: Jul. 5, 1988

[54] CARRIER DEVICE FOR AN OVERHEAD SUSPENSION TRANSPORT SYSTEM

[75] Inventors: Rolf Schönenberger, Landsberg/Lech; Werner Bergmeier, München; Johann Robu, Olching; Walter Kunze, Augsburg, Fed. Rep. of Germany

[73] Assignee: Veit GmbH & Co., Fed. Rep. of Germany

[21] Appl. No.: 915,271

[22] Filed: Oct. 3, 1986

[30] Foreign Application Priority Data

Oct. 3, 1985 [EP] European Pat. Off. ........ 85112552.6

[51] Int. Cl.⁴ .............................................. A47F 7/00
[52] U.S. Cl. .................................... 211/113; 211/125; 211/44; 211/162
[58] Field of Search ................. 211/162, 125, 113, 44, 211/46

[56] References Cited

U.S. PATENT DOCUMENTS

| | | | |
|---|---|---|---|
| 1,637,573 | 8/1927 | Johansson | 211/162 |
| 1,639,729 | 8/1927 | Hill | 211/125 |
| 2,921,689 | 1/1960 | Reimenschneider | 211/113 X |
| 2,928,550 | 3/1960 | Stobie | 211/46 |
| 2,957,590 | 10/1960 | Arminger | |
| 3,235,059 | 2/1966 | Cooper | |
| 4,003,315 | 1/1977 | Barth | |
| 4,029,212 | 6/1977 | Vadiski | 211/113 |

FOREIGN PATENT DOCUMENTS 590167 10/1975 Switzerland .

Primary Examiner—Robert W. Gibson, Jr.
Attorney, Agent, or Firm—Darby & Darby

[57] ABSTRACT

A carrier devices is described for an overhead suspension transport system. The device has an angular carrier member with a first arm pivotally mounting a hanger bracket which is adapted to be supported on a rail system by means of rollers. A second arm extends in a substantially upright orientation, at least in its used position, and releasably supports, at vertically spaced positions, a plurality of rods for supporting goods to be conveyed. Each of the rods extends through a bore in the second arm to be lockably retained in the bore by one of its end portions, and it is constructed so that, when it is extracted from the bore, the end portion is extracted first. Each of the bores extends substantially parallel to the first arm.

20 Claims, 4 Drawing Sheets

CARRIER DEVICE FOR AN OVERHEAD SUSPENSION TRANSPORT SYSTEM

DESCRIPTION

The present invention relates to a carrier device for an overhead suspension transport system.

In a carrier device of this type known from U.S. Pat. No. 2,957,590, the rods are formed as U-shaped forks having their intermediate connecting portions mounted in hook-shaped brackets themselves secured to the second arm by means of clamping screws. This type of rod-mounting is rather complicated and results in time-consuming operations for dismounting and adjustment of the rods.

It is an object of the present invention to simplify the construction and manipulation of a carrier device of the type defined above.

The mounting of each rod in a bore ensures satisfactory support for the carrying end of the rod and facilitates its locking in position while resulting in a simplified overall construction. A substantial advantage results from the direction of displacement of the rods relative to the second arm on insertion and extraction with regard to the operative position of the inserted rods. As individual rods are being dismounted, they are retracted from the supporting zones of the remaining rods towards the rod-free side of the carrier member. This area is freely accessible for the operator for manipulating the rods, whereas it would otherwise be required to intervene between possibly still loaded other rods. During its extraction movement the rod is always guided and supported in the respective bore, so that its range of movement is restricted to the previously occupied alignment. Any goods possibly still carried by the carrier device can thus not be damaged by uncontrolled movements of the rod, and cannot either interfere with the extraction and insertion movements.

The above discussed advantages are enhanced by a construction which permits the conveyance and if need be also the storage of baled goods having axial engagement cavities at both sides or a continuous passage extending therethrough in the axial direction. This construction merely requires the bale to be aligned between the two carrier members, whereupon a rod may be inserted at a suitable height through the respective second arm and into the bale from each end thereof, and subsequently locked to the respective carrier member. Depending on the diameter of the bales or rolls, a plurality thereof may be mounted on a pair of carrier members at vertically spaced positions. The above discussed direction of movement of each rod on insertion and extraction thereof permits individual bales to be mounted and dismounted one at a time irrespective of whether or not one or more other bales are mounted thereabove or below.

According to an advantageous embodiment of the invention, any rods temporarily not required for a carrying function need not be removed from the carrier member. This is particularly advantageous when the carrier device including its rods is to be stored at a standby position in a space-saving configuration. But also for movement of the carrier device along the transport system between different storage and/or processing stations, involving repeated changes regarding the type and amounts of the goods to be conveyed, it is advantageous that the rods do not have to be removed and stored but can be carried along in a laterally suspended position on the carrier member. In this manner they are then always available whenever there is a load for them. In addition, removed rods will not accumulate at locations from which they would have to be conveyed to other locations of employ.

A simple locking construction is another feature of the present invention. An extension of the type described may be formed in a very simple manner by suitably bending one end of the rod. The manipulation of the rod for locking and releasing it is extremely simple. This construction does not require any loose components which might get lost or worn during repetitive changes of the rod arrangement.

The positioning of the extension and the connecting portion, and particularly also the diameter of these portions of the rod, permit the rod to be moved in a simple manner to a rest position in which it is retained by the arm. By suitably pivoting the rod the connecting portion may be inserted into the bore for suspending the rod in a substantially vertical position. Although the rod is not locked in this position, its angled configuration, particularly that of the locking extension, prevent it from dropping out of the bore.

The capability of the carrier device of carrying goods of widely varying nature is further improved by certain features of the invention. The shifting of the suspension location on the first arm of the carrier member results in a change of the relationship between the suspension location and the center of gravity of the carrier device partly determined by the load thereon, and thus of the angle of the second arm relative to the vertical. The second arm and the rods can thus be readily aligned in the optimum, i.e. safest position for the goods to be conveyed.

Further particulars of the carrier device according to the invention and the advantages obtained thereby will become evident from the following description of a preferred embodiment, given by way of example with reference to the accompanying drawings, wherein.

Figure 1:
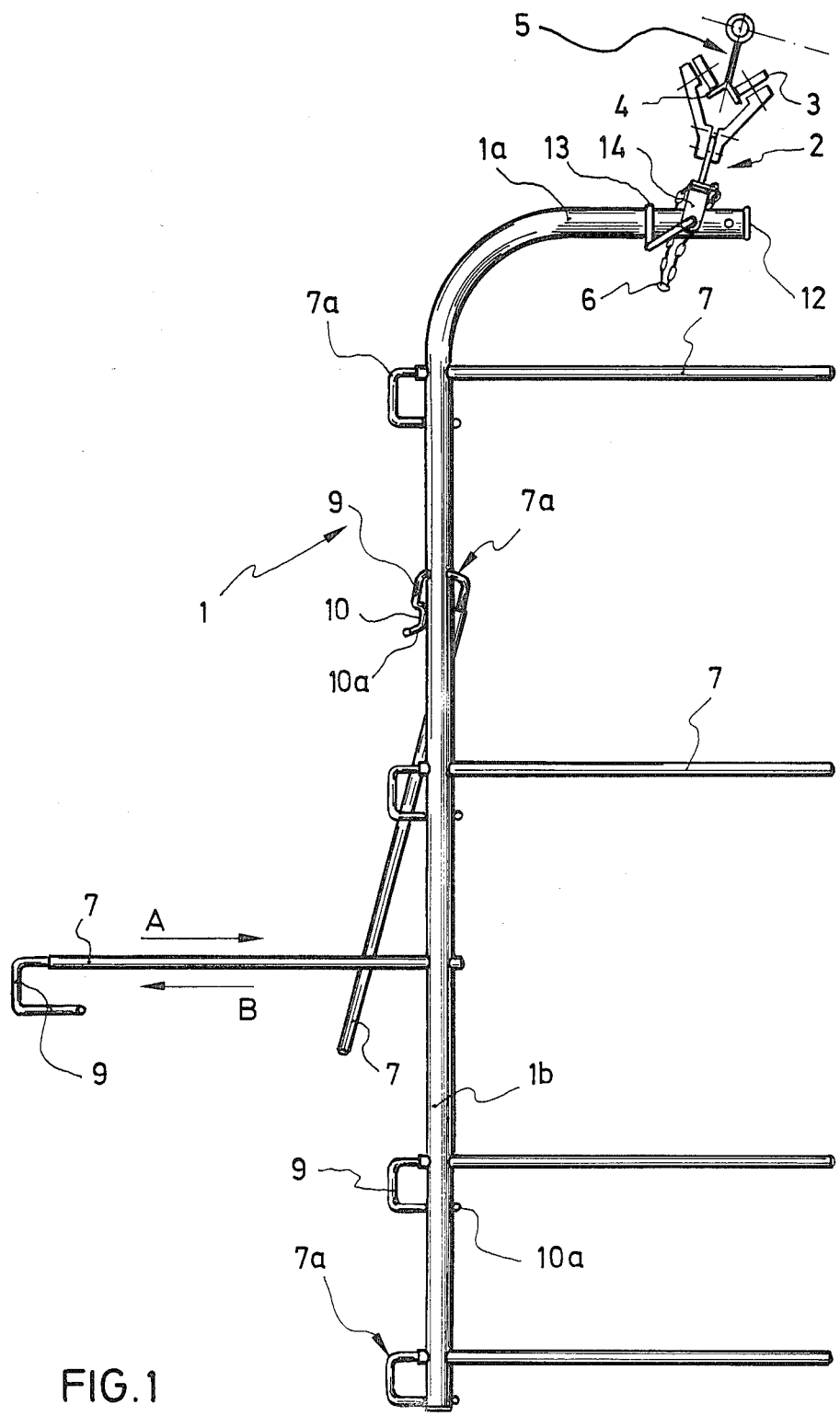
FIG. 1 shows a front view of a carrier device.

A carrier device shown in FIG. 1 comprises an angular carrier member 1 having a short first arm 1a and a longer second arm 1b extending substantially perpendicular thereto and connected thereto by an arcuate connecting portion. Mounted on first arm 1a at a spaced location from the free end thereof is a hanger bracket generally indicated at 2. Hanger bracket 2 is supported by rollers 3 resting on a rail 4 of substantially V-shaped cross-sectional shape forming part of a rail system generally indicated at 5. Hanger bracket 2 permits carrier member 1 to be displaced along rail system 5 either manually or by a power drive system (not shown). A connecting chain 6 secured to hanger bracket 2 serves for connecting the carrier device to another similar one for displacement as a unit.

When carrier member 1 is secured to hanging bracket 2, second arm 1b of carrier member 1 is directed substantially downwards. Arm 1b carries six rods 7 each received in a respective bore 8. As indicated by the different positions of rods 7 in FIG. 1, each rod is adapted to be inserted into and retracted from its respective bore 8 in the direction of arrows A and B, respectively. The inserted rods are adapted to be locked on arm 1b in substantially perpendicular alignment thereto, as will be explained in detail. In addition, each rod 7 is adapted to be displaced to a rest position on arm 1b, as shown by the second rod from above in FIG. 1. In this position rod 7 hangs down along arm 1b substantially in the same direction therewith.

Figure 2:
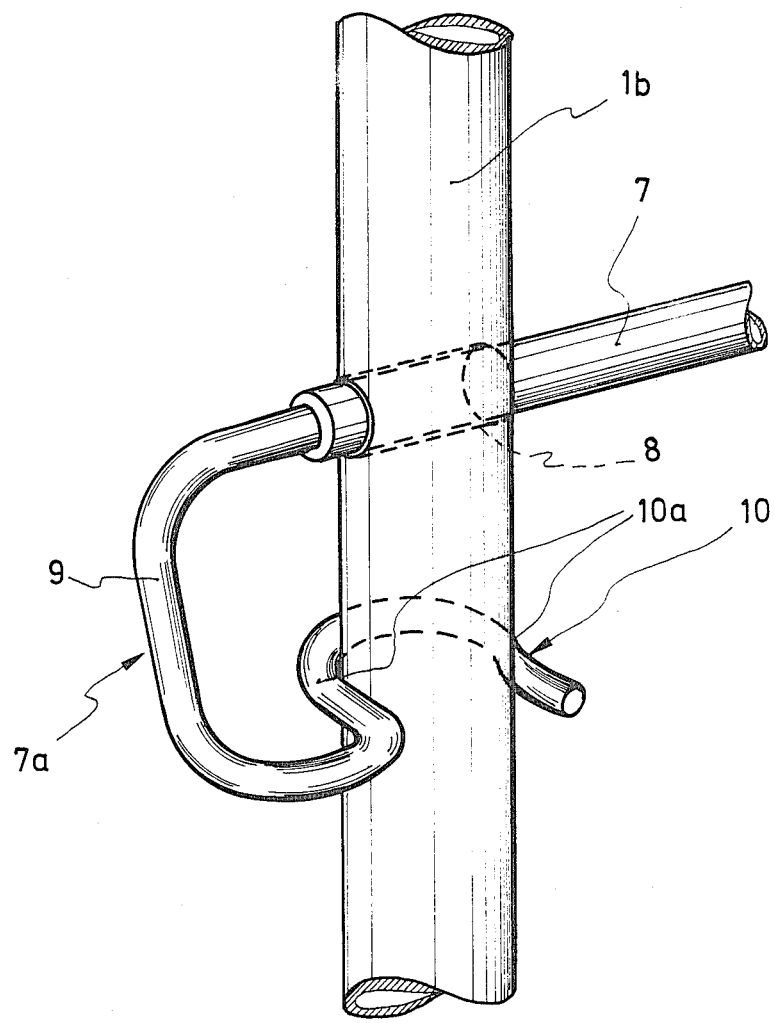
FIG. 2 shows an enlarged detail thereof.

Each rod 7 is formed with an end portion 7a serving for locking it on carrier member 1 and having a smaller diameter than the remaining rectilinear portion of rod 7. FIG. 2 shows an enlarged view of this end portion, together with a section of second arm 1b. End portion 7a comprises an arcuate connecting portion 9 extending in a common plane with the rectilinear portion of the rod. Arcuate portion 9 extends from rod 7 in axial alignment and terminates substantially parallel to the rod. A U-shaped extension 10 extends from connecting portion 9 substantially at right angles thereto, i.e., in a plane extending substantially perpendicular to the plane of connecting portion 9. The spacing between the legs 10a of extension 10 is dimensioned so as to permit extension 10 to grip second arm 1b with a slight clamping fit.

Figure 4:
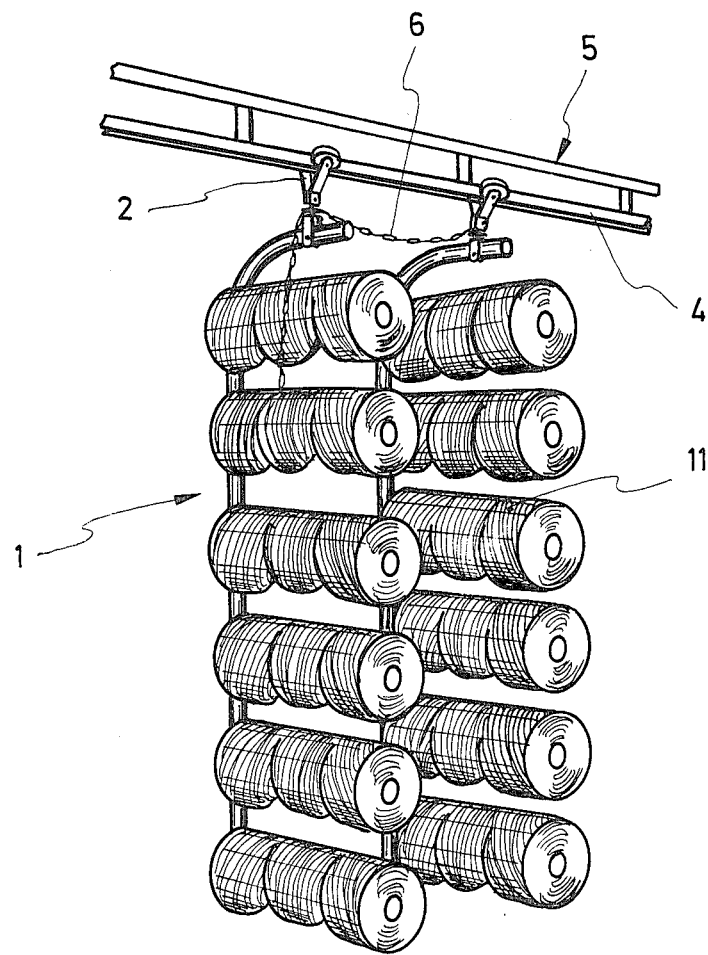
FIG. 4 shows a further form of employ of the carrier device.

Connecting portion 9 serves mainly as a handle for manipulating rod 7 during insertion and extraction. In its rest position rod 7 is suspended on arm 1b by connecting portion 9 received in bore 8 for this purpose. For locking rod 7 in its operative position after insertion into bore 8, an operator grips the handle formed by connecting portion 9 and rotates rod 7 about its axis so as to clampingly engage legs 10a of extension 10 with second carrier arm 1b as shown in FIG. 2. The rod is then secured against axial displacement and rotation and is thus ready for having goods to be conveyed placed thereon. These goods may be of various shapes and sizes. An example is shown in FIG. 4, with three yarn spools mounted on each rod of carrier member 1, two carrier devices being coupled to one another by connecting chain 6 for displacement as a unit.

Figure 3:
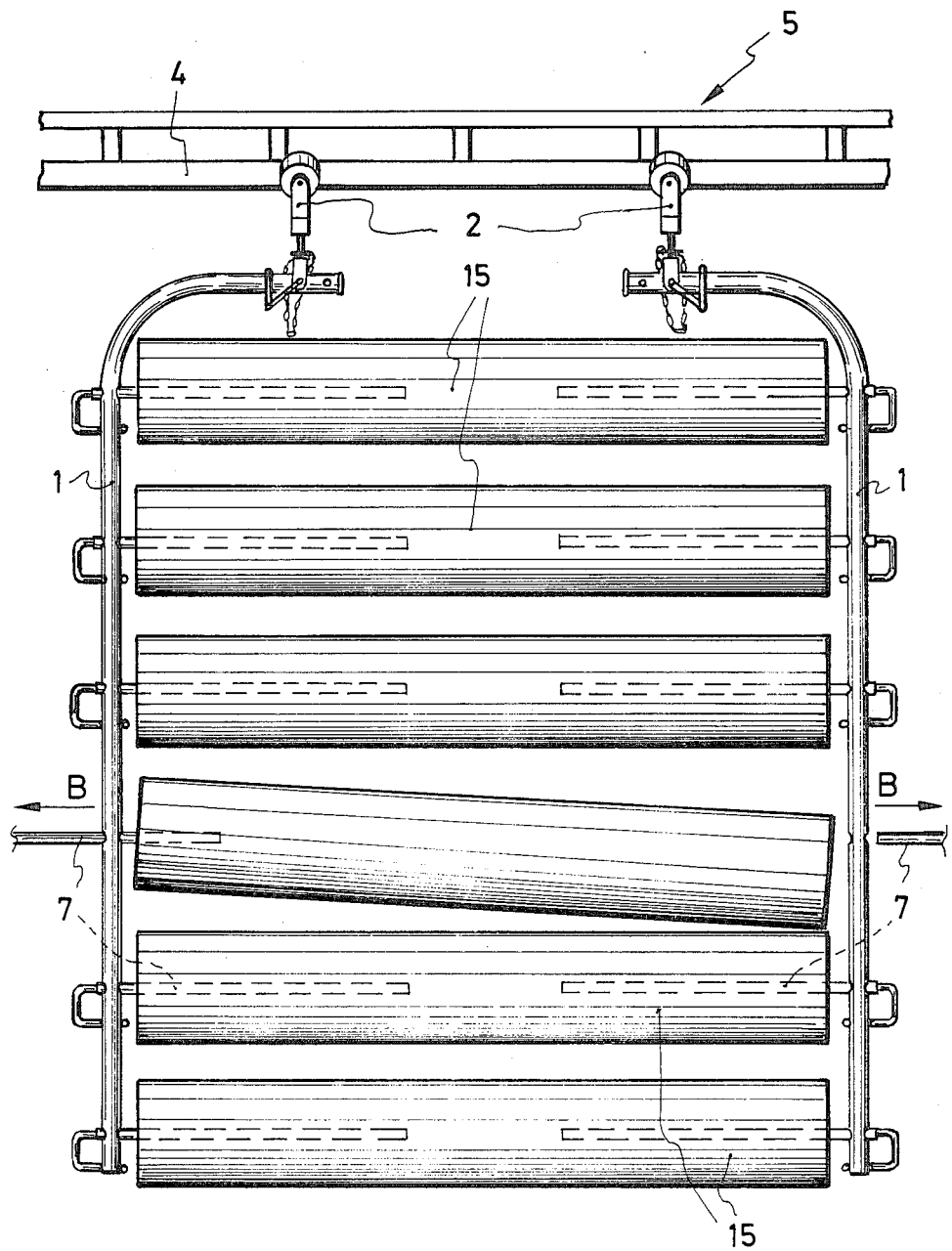
FIG. 3 shows a form of employ of the carrier device.

The goods to be conveyed may also comprise objects suspended from rods 7 or supported thereon. The size of the spacing between loaded rods 7 can be varied by extracting individual rods or by pivoting them to their rest position. A more or less vertical position of second arm 1b of carrier member 1 may be desired, depending on the type of the goods to be carried. In the case of the rod-mounted yarn spools shown in FIG. 4 the loaded carrier member is preferably suspended at such a position that the free ends of the rods are directed slightly upwards so as to prevent the yarn spools from dropping off. For other types of loads a substantially horizontal alignment of the rods may be preferable (FIG. 3). The angular position of the carrier device may be adjustable by permitting hanger bracket 2 to be secured to first carrier arm 1a at different spacings from its free end. To this purpose first arm 1a is formed with a plurality of bores 12 for securing hanger bracket 2 by means of a pin 13 inserted through bore 12 and corresponding bores in a forked portion 14 of hanger bracket 2. Pin 13 may be locked on carrier member 1 in the same manner as rods 7.

A particular form of employ of the carrier device is shown in FIG. 3. In this figure, two carrier devices are employed for mounting bales 15 of a wound sheet material for conveyance along rail system 5. To this purpose the two carrier devices are positioned with the free ends of the respective rods 7 facing towards one another. This is made possible by a rotary mounting in hanger brackets 2. Respective rods 7 are inserted into the hollow core of bale 15 from each end thereof. This permits each bale to be mounted and dismounted without regard to other loads carried by the carrier device. The third bale from below in FIG. 3 is shown in an intermediate position of the dismounting operation. The righthand rod 7 has already been fully withdrawn from the bale in the extraction direction B. The lefthand rod 7 is not yet fully extracted. The manner in which the bale is supported depends on the prevailing conditions, particularly on the size and weight of the bale. In the same manner a bale or roll may be mounted at any intermediate position of the carrier device.

The invention is not restricted to the embodiments shown and described by way of example, the essential characteristic being that each rod is adapted to be mounted on the carrier member with its free end leading and to be extracted therefrom in the opposite direction, and that each rod can be locked in a simple manner. The shape of the respective rod end portion may be varied, particularly as regards the configuration of the portion serving as the handle. The adjustable connection between the carrier member and the hanger bracket may also be varied within the scope of the invention, it being for instance possible to provide a construction comprising an elongate opening in combination with a clamping attachment for this purpose.

What is claimed is:

1. A carrier device for an overhead suspension transport system, comprising an angular carrier member having a first arm pivotally mounting a hanger bracket adapted to be supported on a rail system by means of rollers, and a second arm extending in a substantially upright orientation at least in its use position and releasably supporting at vertically spaced positions a plurality of rods for directly or indirectly supporting goods to be conveyed, characterized in that each of said rods extends through a bore in said second arm to be lockably retained therein by one of its end portions, and is adapted to be extracted therefrom with said end portion first, each of said bores extending substantially parallel to said first arm.

2. A carrier device according to claim 1, characterized in that for supporting and conveying bales or rolls of a wound sheet material two carrier members are arranged with their rods directed towards one another, so that each bale is supported by two rods extending thereinto from opposite ends.

3. A carrier device according to claim 1, characterized in that said rods are adapted to be displaced to a substantially vertical rest position on said second arm.

4. A carrier device according to claim 1, characterized in that said rods are adapted to be locked on said second arm in their carrying position by means of an extension clampingly gripping said second arm about part of its circumference.

5. A carrier device according to claim 4, characterized in that said extension is substantially U-shaped with the spacing of its legs corresponding to the arm diameter in a clamping fit.

6. A carrier device according to claim 4 or 5, characterized in that an arcuate connecting portion serving as a handle is formed between said extension and the remainder of said rod.

7. A carrier device according to claim 6, characterized in that said extension and said connecting portion extend in two mutually substantially perpendicular planes.

8. A carrier device according to any one of claims 4 or 5, characterized in that said extension has, a smaller diameter than the remainder of said rod.

9. A carrier device at least according to claim 1, characterized in that said hanger bracket is adapted to be secured to said first arm of said carrier member at different spacings from the free end thereof.

10. A carrier device according to claim 9, characterized in that said first arm is formed with a plurality of mounting bores for securing said hanger bracket.

11. A carrier device according to any one of claims 3-5, characterized in that for supporting and conveying bales or rolls of a wound sheet material two carrier members are arranged with their rods directed towards one another, so that each bale is supported by two rods extending thereinto from opposite ends.

12. A carrier device according to claim 6, characterized in that for supporting and conveying bales or rolls of a wound sheet material two carrier members are arranged with their rods directed towards one another, so that each bale is supported by two rods extending thereinto from opposite ends.

13. A carrier device according to claim 7, characterized in that for supporting and conveying bales or rolls of a wound sheet material two carrier members are arranged with their rods directed towards one another, so that each bale is supported by two rods extending thereinto from opposite ends.

14. A carrier device according to claim 8, characterized in that for supporting and conveying bales or rolls of a wound sheet material two carrier members are arranged with their rods directed towards one another, so that each bale is supported by two rods extending thereinto from opposite ends.

15. A carrier device according to claim 3, characterized in that said rods are adapted to be locked on said second arm in their carrying position by means of an extension clampingly gripping said second arm about part of its circumference.

16. A carrier device according to any one of claims 4 or 5, characterized in that said connecting portion has a smaller diameter than the remainder of said rod.

17. A carrier device according to claim 6, characterized in that said extension has, a smaller diameter than the remainder of said rod.

18. A carrier device according to claim 6, characterized in that said connecting portion has, a smaller diameter than the remainder of said rod.

19. A carrier device according to claim 7, characterized in that said extension has, a smaller diameter than the remainder of said rod.

20. A carrier device according to claim 7, characterized in that said connecting portion has, a smaller diameter than the remainder of said rod.

* * * * *